United States Patent

[11] 3,581,553

| [72] | Inventor | Lewis A. Dever |
| | | Cincinnati, Ohio |
| [21] | Appl. No. | 775,702 |
| [22] | Filed | Nov. 14, 1968 |
| [45] | Patented | June 1, 1971 |
| [73] | Assignee | The Cincinnati Milling Machine Co. |
| | | Cincinnati, Ohio |

[54] HEAT EXPANSION DETERMINING MEANS
14 Claims, 4 Drawing Figs.

| [52] | U.S. Cl. | 73/16 |
| [51] | Int. Cl. | G01n 1/00 |
| [50] | Field of Search | 73/16, 15.6, 15 |

[56] References Cited
UNITED STATES PATENTS

| 2,559,789 | 7/1951 | Peckham | 73/16 |
| 2,656,712 | 10/1953 | Comstock | 73/16 |
| 3,271,996 | 9/1966 | Paulik et al. | 73/16 |
| 3,474,658 | 10/1969 | Levy et al. | 73/16 |

Primary Examiner—James J. Gill
Assistant Examiner—John K. Lunsford
Attorney—Frank C. Leach, Jr ABSTRACT: Separate means measure the expansions in opposite directions of a spindle and its carrier housing due to heat. Comparison of the outputs of the two measuring means provides a signal indicative of the total amount of movement of the cutting tool on the spindle from a reference position due to heat expansion.

INVENTOR.
LEWIS A. DEVER
BY
Frank C. Leach Jr.
ATTORNEY

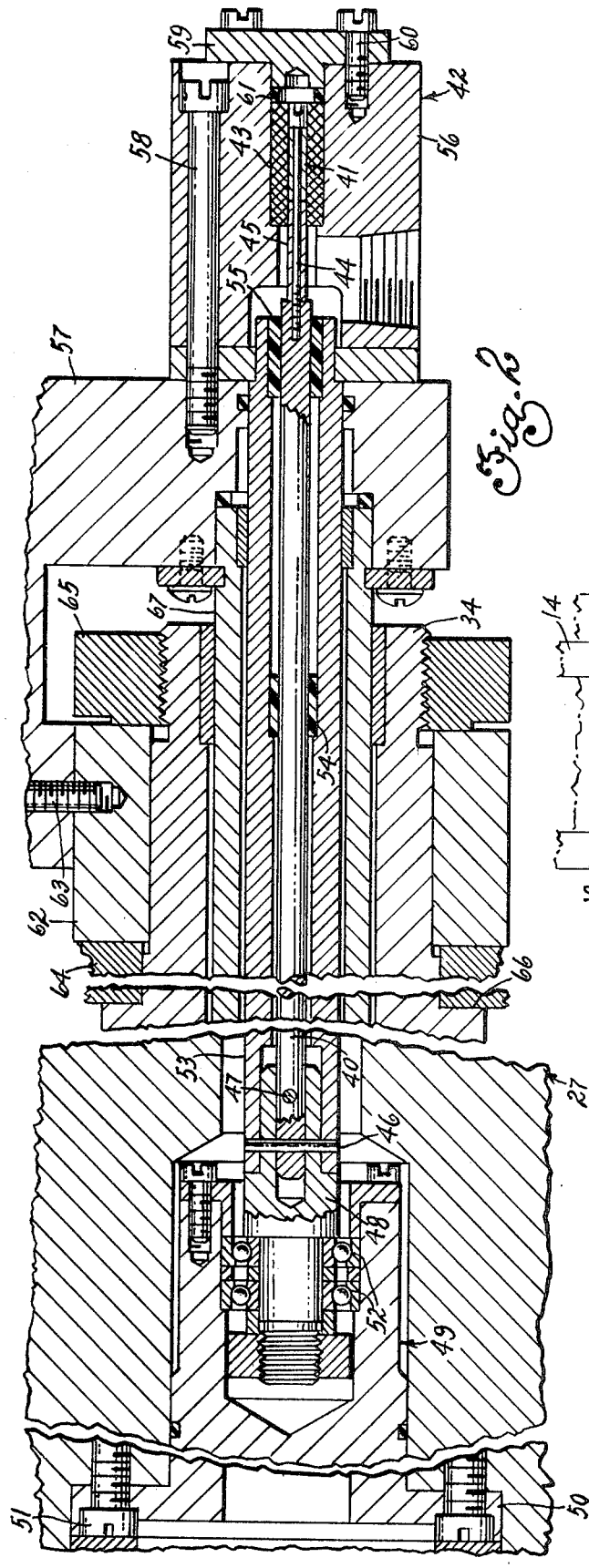
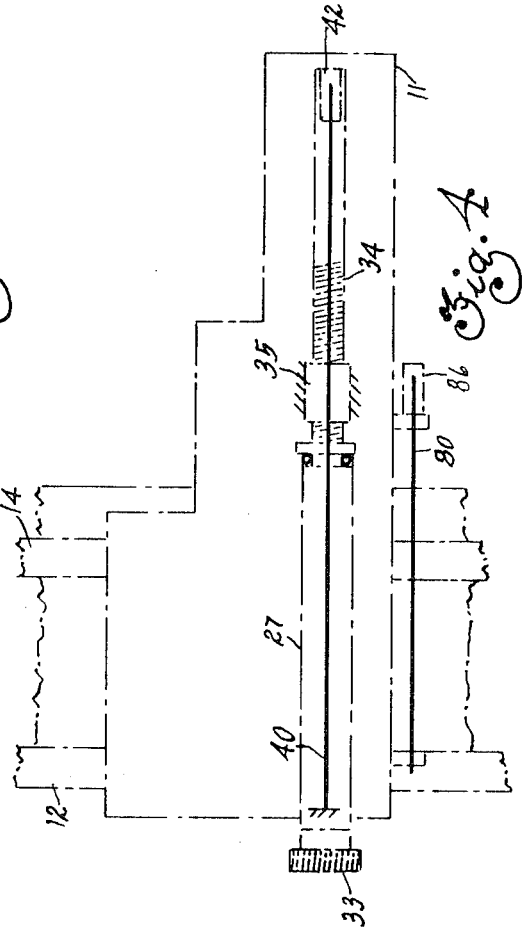
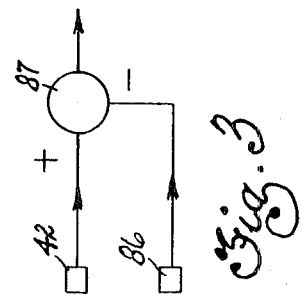

HEAT EXPANSION DETERMINING MEANS

In bar-type milling machines, the cutting tool is extended a substantial distance from the spindle carrier housing during various cutting operations. For example, in machining a deep pocket in a workpiece, the spindle, which carries the cutting tool, must be extended a substantial distance from the carrier housing. Since this deep pocket may have a relatively small tolerance as to the depth to which it is to be machined, the movement of the cutting tool into the pocket must be precisely controlled.

Because of the heat generated during the cutting operation by the cutting process and by the support bearings for the spindle in the carrier and the ambient temperature, the various machine elements of a bat-type milling machine tend to expand during cutting operations. This will have an effect on the length of the spindle carrier housing, the spindle, and the axial feed drive of the spindle. Thus, a small change in either the ambient temperature or in the temperature created by the cutting operation and the spindle bearings can cause thermal expansion of the various machine elements of a bar-type milling machine.

The thermal expansion of the spindle is such that the spindle tends to expand in a direction away from the carrier housing. If the spindle should expand for an additional 0.010 inch, this would result in the cutting tool being advanced an additional 0.010 inch into the pocket being machined beyond that desired.

Because the carrier housing, which supports the spindle for both axial and rotational movement therein, is mounted on two vertical ways and bearings cooperate with the forward of the two ways, it can only expand in the opposite direction to that in which the spindle expands. Thus, if heat expansion causes the carrier housing to extend 0.005 inch when the spindle extends 0.010 inch due to heat expansion, the total movement of the cutting tool from its reference position is the difference in the two expansions; that is, the cutting tool moves 0.005 inch further into the pocket than the operator of the machine thinks that it moves. Thus, thermal expansion of the machine elements of the bar-type milling machine can prevent the formation of a pocket in a workpiece, for example, with the desired depth depending on the tolerance.

The present invention satisfactorily solves the foregoing problem by compensating for the amount of movement of the cutting tool due to thermal expansion of the various machine elements of a bat type milling machine. Thus, for example, if the cutting tool should be moved 0.005 inch beyond its initial reference position due to thermal expansion, this amount of movement is subtracted from the total amount of advancement desired by the cutting tool into a cut such as a pocket, for example. That is, the cutting tool is advanced 0.005 inch less than that required to machine the depth of the cut.

An object of this invention is to provide a device for determining thermal expansion of a member.

Another object of this invention is to provide means for determining the difference in thermal expansions of a spindle and its housing.

Other objects of this invention will be readily perceived from the following description, claims, and drawings.

This invention relates to a device for determining the change in the length of a member due to heat including a rod having one end attached to the member with the rod formed of a material having a relatively low coefficient of thermal expansion in comparison with the coefficient of thermal expansion of the member. Means cooperates with the other end of the rod to determine the amount of movement of the member.

This invention also relates to a device for determining the total relative change in the length of a pair of members mounted in surrounding relation due to heat expansion causing movement of the members in opposite directions. The device includes a first rod attached to one of the members adjacent one end thereof with the first rod being formed of a material having a relatively low coefficient of thermal expansion in comparison with the coefficient of thermal expansion of the one member and a second rod attached to the other of the members adjacent one end thereof with the second rod being formed of a material having a relatively low coefficient of thermal expansion in comparison with the coefficient of thermal expansion of the other member. First means cooperates with the other end of the first rod to determine the amount of movement of the one member while second means cooperates with the other end of the second rod to determine the amount of movement of the other member. Signals from the first and second means are compared by means, which produces an output indicating the difference between the signals to indicate the total relative change of the two members.

This invention further relates to an improvement in a spindle mechanism that has a movable housing supporting a movable spindle therein in which the spindle and the housing expand in opposite directions due to heat. The improvement has first means to determine the amount of axial movement of the spindle due to heat with the first means producing a signal indicative of the amount of movement of the spindle from a reference position and second means to determine the amount of movement of the housing, due to heat, parallel to the axial movement of the spindle with the second means producing a signal indicative of the amount of movement of the housing from a reference position. The improvement has third means to compare the signals from the first and second means with the third means producing a signal indicative of the difference of the signals from the first and second means.

The attached drawings illustrate a preferred embodiment of the invention, in which:

FIG. 2 is an enlarged fragmentary elongated sectional view of a portion of the bar-type milling machine of FIG. 1 and showing details of the means for measuring the thermal expansion of the spindle;

FIG. 3 is a schematic circuit diagram illustrating the comparison of the signals from means that determine the thermal expansion of the spindle and its housing; and FIG. 4 is a schematic view showing the arrangement of the two measuring means for determining the thermal expansion of the spindle and its housing.

Figure 1:
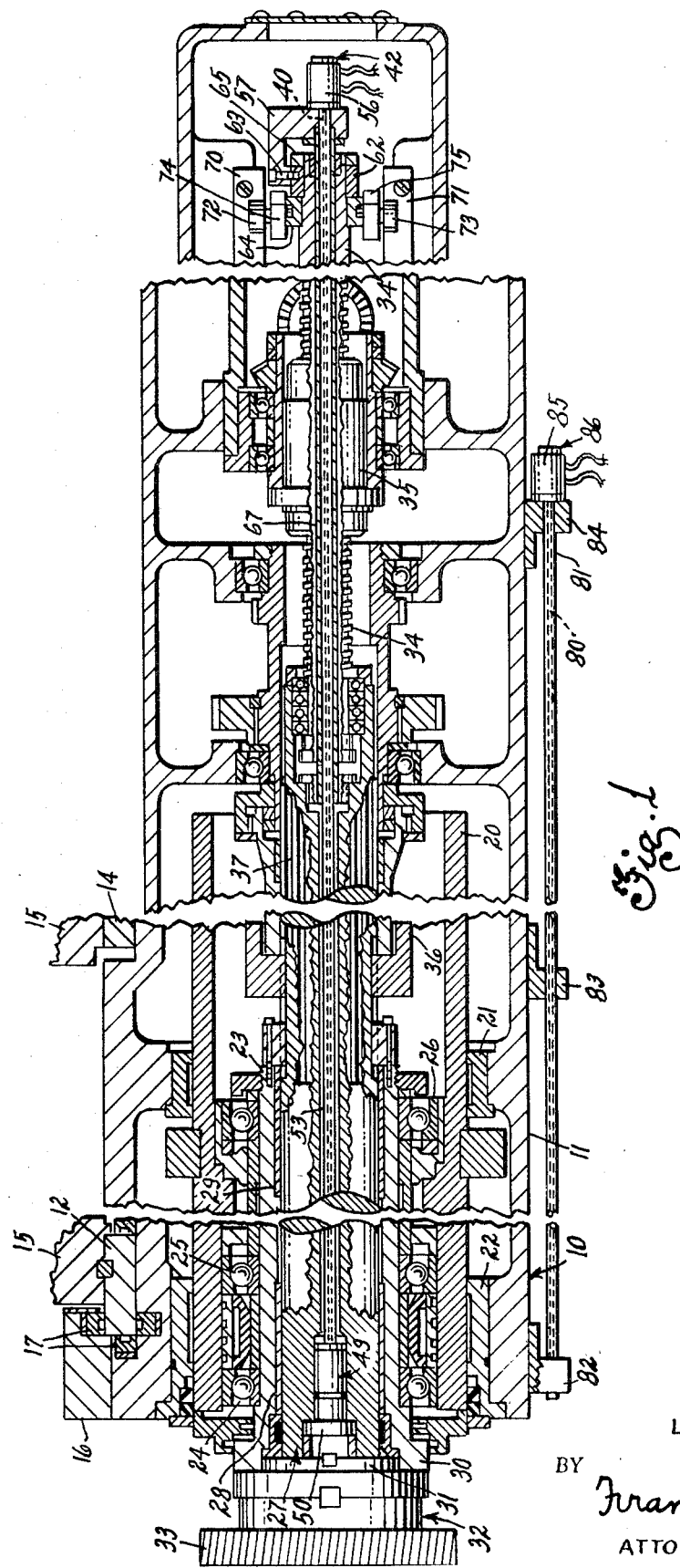
FIG. 1 is an elongated sectional view of a bar-type milling machine utilizing the present invention to determine thermal expansion of a spindle and its housing.

Referring to the drawings and particularly FIG. 1, there is shown a spindle carrier 10 of the type more particularly shown and described in the copending patent application of Herman J. Baldwin for "Machine Tool Spindle Apparatus," Ser. No. 775,701, filed Nov. 14, 1968, and assigned to the same assignee as the assignee of the present application. The spindle carrier 10 includes a hollow housing 11, which is mounted for vertical movement along a pair of vertical ways 12 and 14 that are carried by a vertical column 15. The housing 11 is held on the ways 12 and 14 by retaining strips (one shown at 16), which are attached to the housing 11 and overlap portions of the ways 12 and 14. The column 15 is adapted to be moved in a horizontal direction along the ways of a bed.

Bearings 17 are disposed between the forward, rear, and one side of the front way 12 and the housing 11 and between the other side of the front way 12 and the retaining strip 16. The bearings 17 serve as a guide along the way 12, which prevents the housing 11 from expanding forwardly due to heat.

The housing 11 has a quill 20 disposed therein in spaced relation thereto. The quill 20 is supported within the housing 11 by a pair of hydrostatic bearings 21 and 22. As more particularly shown and described in the aforesaid Baldwin application, the quill 20 is capable of moving only axially within the housing 11 and cannot rotate therein.

As intermediate spindle or support 23 is disposed in spaced relation to the quill 20 and rotatably mounted therein by a plurality of horizontally spaced bearings 24—26. Thus, the intermediate spindle 23 is adapted to be rotated relative to the quill 20. Because of the mounting arrangement of the bearings 24-

—26, any axial movement of the quill 20 is transmitted to the intermediate spindle 23 through the bearings 24—26.

A bar-type spindle 27 is disposed within the intermediate spindle 23. A pair of bronze bushings 28 and 29 on opposite ends of the intermediate spindle 23 maintains the spindle 27 in spaced relation to the intermediate spindle 23. The intermediate spindle 23 has its end 30 enlarged to receive portion 31 of an adapter plate 32, which is secured to the end 30 of the intermediate spindle 23. The portion 31 of the adapter plate 32 is secured to the spindle 27 so that the adapter plate 32 connects the spindle 27 and the intermediate spindle 23 to each other. When this occurs, a cutting tool 33, which has a relatively large diameter in comparison to the diameter of the spindle 27, may be secured to the adapter plate 32 as more particularly described in the aforesaid Baldwin application.

The spindle 27 is moved axially in a horizontal direction, which is perpendicular to the horizontal direction in which the column 15 is moved, relative to the housing 11 by an axial feed means in the manner more particularly shown and described in the aforesaid Baldwin application. The axial feed means includes a feed screw 34, which is a conventional ball bearing feed screw, and a reciprocating ball bearing nut 35. As more particularly described in the aforesaid Baldwin application, the feed screw 34 is connected directly to the spindle 27 to cause axial movement of the spindle 27 while still allowing rotation of the spindle 27 when such is desired.

The rotating means for the spindle 27 is more particularly shown and described in the aforesaid Baldwin application. The rotating means causes rotation of the spindle 27 by a collar 36 cooperating with a splined rear portion 37 of the spindle 27.

The means for measuring or determining the amount of movement of the spindle 27 in an axial direction due to thermal expansion includes a control rod 40, which is formed of a material having a low coefficient of thermal expansion in comparison with the coefficient of thermal expansion of the material of the spindle 27. When the spindle 27 is formed of carbon steel, one suitable example of the material of the control rod 40 is the material sold under the trademark Invar by Carpenter Steel Co. Invar has a coefficient of thermal expansion of about one-ninth of the coefficient of thermal expansion of carbon steel.

One end of the control rod 40 is fixed to the spindle 27 for movement therewith while the other end carries a magnetic core 41 (see FIG. 2) of a low voltage differential transformer 42 (see FIG. 3), which includes coils 43 surrounding the core 41. The core 41 is supported on a nonmagnetic screw 44, which is threaded in the end of the control rod 40. A nonmagnetic spacer 45 is mounted on the screw 44 to maintain the core 41 in the desired relation to the end of the control rod 40 and the coils 43. Thus, any movement of the control rod 40 by the spindle 27 results in movement of the core 41 whereby the low voltage differential transformer 42 produces a signal indicative of this amount of movement.

Since the control rod 40 has a coefficient of thermal expansion of about one-ninth of the coefficient of thermal expansion of the spindle 27, any thermal expansion of the control rod 40 is negligible in comparison with the amount of movement of the spindle 27 due to thermal expansion. Thus, the control rod 40, which is secured adjacent the front of the spindle 27, moves the magnetic core 41 relative to the coils 43, which are rearward of the control rod 40, whenever the spindle 27 moves due to thermal expansion.

The control rod 40 is connected to the spindle 27 so that any axial movement of the spindle 27 by the axial feed means also causes movement of the control rod 40 therewith but any rotational movement of the spindle 27 by the rotation means does not cause rotation of the control rod 40. The control rod 40 is fixed by pins 46 and 47 to an adapter pin 48. The adapter pin 48 is rotatably mounted within a support plug 49, which has its head 50 fixedly secured to the spindle 27 by screws 51, by bearings 52 (see FIG. 2), This arrangement permits the spindle 27 to rotate relative to the control rod 40 while still causing the control rod 40 to axially move with the forward end of the spindle 27 when it moves due to either expansion caused by heat or the axial feed means.

A cover tube 53, which surrounds the control rod 40 for substantially its entire length, also is secured to the adapter pin 48 by the pins 46 and 47. The cover tube 53 has Teflon bushings 54 and 55 to support the rear end of the control rod 40.

The coils 43 of the low voltage differential transformer 42 are supported by a housing 56, which is secured to a bracket 57 by screws 58. A cap 59, which is secured to the housing 56 by screws 60, and an O-ring 61 cooperate to maintain the coils 43 in the desired position within the housing 56.

The bracket 57 is carried on the end of the feed screw 34. The bracket 57 is fixed to an adapter plate 62, which is carried by the feed screw 34, by screws 63.

The adapter plate 62 is carried on the feed screw 34 between a support block 64 and a lock nut 65, which cooperates with threads on the end of the feed screw 34. The support block 64 has its side, which is opposite to the side engaging the adapter plate 62, bearing against a shoulder 66 on the feed screw 34. Thus, the lock nut 65 retains both the support block 64 and the adapter plate 62 on the feed screw 34. A support sleeve 67 is disposed between the cover member 53 and the feed screw 34.

Thus, the transformer housing 56 is fixed to the axial feed screw 34 for movement therewith in an axial direction. Accordingly, any movement of the spindle 27 and its axial feed means due to thermal expansion is measured by the low voltage differential transformer 42 due to relative movement of the magnetic core 41 within the coils 43 since the core 41 is connected to the front of the spindle 27 while the coils 43 are disposed rearward of the feed screw 34.

In order for the ball nut 35 to axially move the spindle 27 without causing rotation of the feed screw 34, it is necessary for the feed screw 34 to be prevented from rotating when the ball nut 35 rotates. Accordingly, as shown in FIG. 1, a pair of support rails 70 and 71 is fixed to the housing 11. Two cam rollers 72 (one shown) are disposed on opposite sides of the rail 70 while two cam rollers 73 (one shown) are disposed on opposite sides of the rail 71. The rollers 72 are rotatably supported on a pivot block 74, which is fixed to the support block 64, while the rollers 73 are rotatably supported on a pivot block 75, which is fixed to the support block 64 on the opposite side thereof from the pivot block 74.

This arrangement allows the feed screw 34 to move axially along the longitudinal axes, which are parallel, of the rails 70 and 71. Thus, rotation of the axial feed screw 34 by the feed nut 35 is prevented so that the rotational movement of the feed nut 35 is transmitted into axial movement of the feed screw 34. The cam rollers 72 and 73 ride along the support rails 70 and 71 as the feed screw 34 advances the spindle 27 onto and out of the housing 11.

As shown in FIG. 1, a second control rod 80 is mounted exterior of the housing 11. The control rod 80 is formed of a material having a relatively low coefficient of thermal expansion in comparison with the coefficient of thermal expansion of the material of the housing 11. With the housing 11 formed of carbon steel or cast iron, for example, and the rod 80 formed of Invar, then the coefficient of thermal expansion of the rod 80 is approximately one-ninth of the coefficient of thermal expansion of the housing 11.

A cover tube 81 surrounds the control rod 80 in the same manner as the cover tube 53 surrounds the control rod 40. The cover tube 81 has one end fixed to the housing 11 through being secured to a bracket 82, which is secured to the housing 11. By pinning the rod 80 to the cover tube 81 in the portion within the bracket 82, the rod 80 is fixed at one end to the housing 11. The cover tube 81 is supported in brackets 83 and 84, which also are secured to the housing 11, but is slidable with respect thereto.

A transformer housing 85 is secured to the bracket 84 and has coils of a low voltage differential transformer 86 (see FIG.

3) mounted therein in the same manner that the coils 43 of the low voltage differential transformer 42 are mounted within the housing 56. The end of the control rod 80 has a magnetic core mounted thereon in the same manner as the magnetic core 41 is mounted on the end of the control rod 40. Accordingly, this will not be described in detail since it is the same arrangement as for the magnetic core 41.

Since the housing 11 can only expand to the right (as viewed in FIG. 1) because of the way 12, any expansion of the housing 11 results in the transformer housing 85 moving away from the core since the control rod 80 is fixed to the housing 11 at the bracket 82. Therefore, expansion of the housing 11 due to heat results in the low voltage differential transformer 86 producing an output signal indicative of the amount of axial movement of the housing 11 due to heat.

Since the ball nut 35 is fixed to the housing 11, it will move rearwardly with the housing 11. Thus, because of cooperation of the ball nut 35 with the feed screw 34, any axial rearward movement of the ball nut 35 causes similar rearward axial movement of the feed screw 34. Therefore, by locating the transformer housing 85 in the same vertical plane as the ball nut 35 and fixing the control rod 80 in substantially the same vertical plane as the front way 12, the expansion of the housing 11 is indicated by the transformer 86.

By mounting the housing 56 at the rear of the feed screw 34 and connecting the control rod 40 adjacent the forward end of the spindle 27, the total axial thermal elongation of the spindle 27 and the feed screw 34 forwardly with respect to the housing 11 is obtained without regard to the rearward movement of the feed screw 34 due to the ball nut 35 moving rearwardly with the housing 11. This must be compensated for by subtracting the two signals of the two transformers 42 and 86 from each other.

Thus, the output from the transformer 86 is supplied as a negative signal to a summer 87, which also receives the output from the low voltage differential transformer 42 as a positive signal. The summer 87 supplies the difference of the two signals as an output to a numerical control apparatus, for example, which controls the operation of the cutting tool 33. Thus, the signal from the summer 87 corrects the amount of advancement of the cutting tool 33 in an axial direction in accordance with the difference in expansion of the spindle 27 and the housing 11. Because the spindle 27 is surrounded by the housing 11 and is subjected to more heat due to the cutting operation since the cutting tool 33 is mounted on the spindle 27, the spindle 27 usually expands more than the housing 11 so that the signal from the summer 87 usually reduces the advancement of the cutting tool 33.

Accordingly, during any cutting operations of the cutting tool 33, the advancement of the cutting tool 33 is continuously changed to compensate for the relative thermal expansion of the spindle 27 and the feed screw 34 in comparison with the housing 11. Therefore, the cutting tool 33 is always properly positioned with respect to the desired reference position so that very small tolerances may be held during the machining process.

Utilization of substantially the full length of the spindle 27 and the feed nut 34 along with the length of the housing 11 from the way 12 to the ball nut 35 provides an accurate measurement. Of course, the measured lengths could be shortened, and the signals from the transformers 42 and 86 appropriately changed to compensate for smaller measured lengths. However, this would affect the accuracy to a degree.

While the present invention has been described as being utilized to measure the amount of movement of two different members in opposite directions, it should be understood that the present invention may be utilized when it is desired to measure only the amount of movement of one member due to thermal expansion. While the present invention has been shown and described as being employed with a spindle supported by an intermediate spindle, this is not necessary.

An advantage of this invention is that it insures that the cutting tool is disposed at the desired position during cutting operations irrespective of the relative thermal expansions of a spindle, which carries the cutting tool, including its axial feed means, and the housing in which the spindle is supported. Another advantage of this invention is that it permits small tolerances to be employed when utilizing a bar-type milling machine for cutting on or within a workpiece.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What I claim is:

1. A device for determining change in the length of a member due to heat including:
    a rod having one end attached to the member adjacent one end thereof, said rod having its longitudinal axis extending in the same direction as the longitudinal axis of the member;
    said rod being formed of a material having a relatively low coefficient of thermal expansion in comparison with the coefficient of thermal expansion of the member;
    means cooperating with the other end of said rod to determine the amount of movement of the member; and
    said cooperating means including first means connected to said rod adjacent the other end thereof for support thereby and second means connected to the member adjacent the other end thereof for support thereby, said first and second means being relatively movable in the same directions as the longitudinal axis of the member to determine the amount of movement of the member.

2. The device according to claim 1 in which:
    said cooperating means includes a transformer having:
    coils;
    and a magnetic core;
    said rod has one of said magnetic core and said coils on its other end and the other of said magnetic core and said coils is supported by the member, said magnetic core and said coils cooperating to change the signal from said transformer in accordance with movement of the member due to heat.

3. The device according to claim 2 in which said rod supports said magnetic core and said coils are supported by the member.

4. A device for determining total relative change in the length of a pair of members mounted in surrounding relation due to heat expansion causing movement of the members in opposite directions including:
    a first rod attached to one of the members adjacent one end thereof;
    said first rod being formed of a material having a relatively low coefficient of thermal expansion in comparison with the coefficient of thermal expansion of the one member;
    first means cooperating with the other end of said first rod to determine the amount of movement of the one member;
    a second rod attached to the other of the members adjacent one end thereof;
    said second rod being formed of a material having a relatively low coefficient of thermal expansion in comparison with the coefficient of thermal expansion of the other member;
    second means cooperating with the other end of said second rod to determine the amount of movement of the other member; and
    means to compare signals from said first means and said second means and producing an output indicating the difference between the signals to indicate the total relative change of the two members.

5. The device according to claim 4 in which:
    said first means includes a first transformer having:
    coils;
    and a magnetic core;

said first rod has one of said magnetic core and said coils of said first transformer at its other end and the other of said magnetic core and said coils of said first transformer is supported by the one member, said magnetic core and said coils of said first transformer cooperating to change the signal from said first transformer in accordance with the movement of the one member due to heat;

said second means includes a second transformer having:
coils;
and a magnetic core;

and said second rod has one of said magnetic core and said coils of said second transformer at its other end and the other of said magnetic core and said coils of said second transformer is supported by the other member, said magnetic core and said coils of said second transformer cooperating to change the signal from said second transformer in accordance with the movement of the other member due to heat.

6. The device according to claim 5 in which:
said other of said magnetic core and said coils of said first transformer is connected to the one member adjacent the other end thereof for support thereby; and
said other of said magnetic core and said coils of said second transformer is connected to the other member adjacent the other end thereof for support thereby.

7. The device according to claim 5 in which:
said first rod supports said magnetic core of said first transformer and said coils of said first transformer are supported by the one member; and
said second rod supports said magnetic core of said second transformer and said coils of said second transformer are supported by the other member.

8. The device according to claim 7 in which:
said coils of said first transformer are connected to the one member adjacent the other end thereof for support thereby; and
said coils of said second transformer are connected to the other member adjacent the other end thereof for support thereby.

9. In a spindle mechanism having a movable housing supporting a movable spindle therein in which the spindle and the housing expand in opposite directions due to heat, the improvement comprising:
first means to determine the amount of axial movement of the spindle due to heat, said first means producing a signal indicative of the amount of movement of the spindle from a reference position;
second means to determine the amount of movement of the housing, due to heat parallel to the axial movement of the spindle, said second means producing a signal indicative of the amount of movement of the housing from a reference position; and
third means to compare the signals from said first means and said second means, said third means producing a signal indicative of the difference of the signals from said first means and said second means.

10. The improvement according to claim 9 in which:
said first means includes:
a rod having one end attached to the spindle, said rod being formed of a material of a relatively low coefficient of thermal expansion in comparison with the coefficient of thermal expansion of the spindle; and
means adjacent the other end of said rod to produce a signal indicating the amount of movement of the spindle relative to said rod;

and said second means includes:
a rod having one end attached to the housing, said rod being formed of a material of a relatively low coefficient of a thermal expansion in comparison with the coefficient of thermal expansion of the housing; and
means adjacent the other end of said rod to produce a signal indicating the amount of movement of the housing relative to said rod.

11. The improvement according to claim 10 in which:
said signal means of said first means includes:
a first transformer having:
coils;
and a magnetic core;
one of said magnetic core and said coils of said first transformer being supported by said rod of said first means and the other of said magnetic core and said coils of said first transformer being supported by the spindle, said magnetic core and said coils of said first transformer cooperating to change the signal from said first transformer in accordance with the movement of the spindle due to heat;
and a second transformer having:
coils;
and a magnetic core;
one of said magnetic core and said coils of said second transformer being supported by said rod of said second means and the other of said magnetic core and said coils of said second transformer being supported by the housing, said magnetic core and said coils of said second transformer cooperating to change the signal from said second transformer in accordance with the movement of the housing due to heat.

12. The improvement according to claim 11 in which:
said other of said magnetic core and said coils of said first transformer is connected to the spindle adjacent the end thereof remote from the attachment of said rod of said first means to the spindle for support thereby; and
said other of said magnetic core and said coils of said second transformer is connected to the housing adjacent the end thereof remote from the attachment of said rod of said second means to the housing for support thereby.

13. The improvement according to claim 11 in which:
said rod of said first means supports said magnetic core of said first transformer and said coils of said first transformer are supported by the spindle; and
said rod of said second means supports said magnetic core of said second transformer and said coils of said second transformer are supported by the housing.

14. The improvement according to claim 13 in which:
said coils of said first transformer are connected to the spindle adjacent the end thereof remote from the attachment of said rod of said first means to the spindle for support thereby; and
said coils of said second transformer are connected to the housing adjacent the end thereof remote from the attachment of said rod of said second means to the housing for support thereby.

UNITED STATES PATENT OFFICE
CERTIFICATE OF CORRECTION

Patent No. 3,581,553                    Dated  June 1, 1971

Inventor(s)  Lewis A. Dever

It is certified that error appears in the above-identified patent and that said Letters Patent are hereby corrected as shown below:

Column 1, lines 15 and 47, "bat", each occurrence, should read -- bar --. Column 3, line 48, "nonmagnetic" should read -- non-magnetic --; line 49, "nonmag-" should read -- non-mag- --; line 74, the comma should be a period. Column 4, line 55, "onto" should read -- into --. Column 7, line 49, after "heat" insert a comma. Column 8, line 7, cancel "a".

Signed and sealed this 16th day of May 1972.

(SEAL)
Attest:

EDWARD M. FLETCHER, JR.                ROBERT GOTTSCHALK
Attesting Officer                       Commissioner of Patents